(12) United States Patent
Jo et al.

(10) Patent No.: US 9,985,707 B2
(45) Date of Patent: May 29, 2018

(54) MULTIPLE BEAMFORMING TRAINING

(71) Applicant: LG ELECTRONICS INC., Seoul (KR)

(72) Inventors: Kyungtae Jo, Seoul (KR); Hangyu Cho, Seoul (KR); Sungjin Park, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 92 days.

(21) Appl. No.: 15/258,741

(22) Filed: Sep. 7, 2016

(65) Prior Publication Data

US 2017/0070275 A1    Mar. 9, 2017

Related U.S. Application Data

(60) Provisional application No. 62/306,081, filed on Mar. 10, 2016, provisional application No. 62/217,046, filed on Sep. 11, 2015, provisional application No. 62/215,042, filed on Sep. 7, 2015.

(51) Int. Cl.
| | |
|---|---|
| *H04B 7/04* | (2017.01) |
| *H04B 7/06* | (2006.01) |
| *H04B 7/10* | (2017.01) |
| *H04B 7/0408* | (2017.01) |
| *H04B 7/0413* | (2017.01) |
| *H04B 7/0491* | (2017.01) |

(52) U.S. Cl.
CPC ......... *H04B 7/0619* (2013.01); *H04B 7/0408* (2013.01); *H04B 7/0413* (2013.01); *H04B 7/0491* (2013.01); *H04B 7/0617* (2013.01); *H04B 7/0643* (2013.01); *H04B 7/0695* (2013.01); *H04B 7/10* (2013.01)

(58) Field of Classification Search
CPC ............ H04B 7/02–7/12; H04W 52/38–52/50
See application file for complete search history.

(56) References Cited

U.S. PATENT DOCUMENTS

| | | | | |
|---|---|---|---|---|
| 2016/0149302 A1* | 5/2016 | Sanderovich | ............ | H04B 7/04 455/101 |
| 2016/0277088 A1* | 9/2016 | Jo | ........................ | H04B 7/0617 455/101 |
| 2017/0033844 A1* | 2/2017 | Kasher | ................. | H04B 7/0695 455/101 |

* cited by examiner

*Primary Examiner* — Timothy J Weidner
(74) *Attorney, Agent, or Firm* — Lee, Hong, Degerman, Kang & Waimey

(57) ABSTRACT

A method for the multiple beamforming training and an apparatus using the same are provided. An initiator determines a candidate sector to be used for a transmission during a sector sweep. After the initiator exchanges with a responder an information request frame and an information response frame about the multiple beamforming training through the candidate sector, the responder performs a plurality of beam refinement protocol (BRP) processes using a plurality of polarized channels through the candidate sector.

10 Claims, 6 Drawing Sheets

MULTIPLE BEAMFORMING TRAINING

CROSS-REFERENCE TO RELATED APPLICATIONS

Pursuant to 35 U.S.C. § 119(e), this application claims benefit of U.S. Provisional Application Nos. 62/215,042, filed on Sep. 7, 2015, 62/217,046 filed on Sep. 11, 2015, and 62/306,081 filed on Mar. 10, 2016, the contents of which are all hereby incorporated reference herein in their entirety.

BACKGROUND OF THE INVENTION

Field of the Invention

The present invention relates to wireless communication, and more particularly, to a method of performing multiple beamforming training and a device using the same.

Related Art

An IEEE 802.11ad standard is a very high-speed wireless communication standard that operates in a band of 60 GHz or above. Even though a signal can reach about 10 meters, the throughput may support 6 Gbps or more. Since the IEEE 802.11ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11ad standard includes a beamforming training process for antenna beam alignment. To achieve throughput of 20 Gbps or more, a next-generation standard that is being developed on the basis of the IEEE 802.11ad is called as an IEEE 802.11ay. One of the key technologies of the IEEE 802.11ay is a multiple input multiple output (MIMO) beamforming technology through an array antenna. The IEEE 802.11ad as a conventional technology supports a single stream transmission using one array antenna, and a next-generation technology (e.g. IEEE 802.11ay) thereof supports multi-stream transmission using a plurality of antenna arrays.

To apply the plurality of array antennas, it is required that a plurality of independent beamformings are performed, However this may cause severe interference between a plurality of streams and an increase of time required for the beamformings. A method will be proposed to minimize the interference between the streams and reduce the time required for the beamformings.

SUMMARY OF THE INVENTION

The present invention provides a method of performing multiple beamforming training using a polarization.

In an aspect, a method for multiple beamforming training in a wireless local area network (LAN) is provided. The method includes determining, by an initiator, a candidate sector to be used for a transmission by sending a plurality of sector sweep (SSW) messages to a responder simultaneously in a plurality of sector groups through a plurality of antennas during a sector sweep, transmitting, by the initiator, an information request frame for multiple beamforming training through the candidate sector to the responder, receiving, by the initiator, an information response frame from the responder in response to the information request frame through the candidate sector, and performing, by the initiator, a plurality of beam refinement protocol (BRP) processes using a plurality of polarized channels through the candidate sector.

In another aspect, an apparatus for performing multiple beamforming training in a wireless local area network (LAN) is provided. The apparatus includes a transceiver configured to receive and transmit a radio signal, and a processor connected to the transceiver. The processor is configured to determine a candidate sector to be used for a transmission by sending a plurality of sector sweep (SSW) messages to a responder simultaneously in a plurality of sector groups through a plurality of antennas during a sector sweep, transmit an information request frame for multiple beamforming training through the candidate sector to the responder, receive an information response frame from the responder in response to the information request frame through the candidate sector, and perform a plurality of beam refinement protocol (BRP) processes using a plurality of polarized channels through the candidate sector.

It may be possible to perform a plurality of beamforming training at the same time, thereby reducing the time for the beamforming training.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user. Unless a function of the station (STA) is separated from that of an access point (AP), the STA may include a non-AP STA or an AP. When a communication between the STA and the AP is described, the STA may be interpreted as the non-AP STA. When a communication between a STA and a STA is described or when a specific AP function is not required, the STA may be the non-AP STA or the AP.

Figure 1:
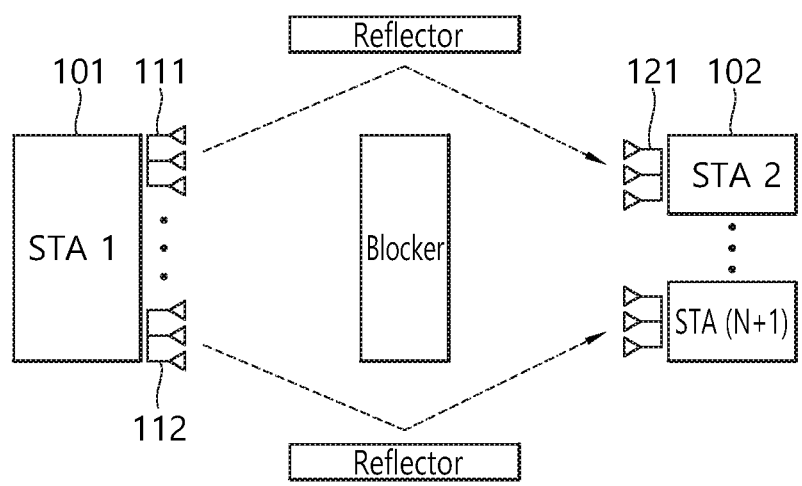
FIG. 1 is a diagram illustrating an example of a multiple input multiple output (MIMO) operation using a plurality of array antennas.

FIG. 1 is a diagram illustrating an example of a multiple input multiple output (MIMO) operation using a plurality of array antennas.

A STA1 101 may be an initiator that starts beamforming (BF) training. A STA2 102 that participates in the BF training may be a responder. The responder may include a plurality of STAs. The STA1 101 may include a plurality of array antennas, and the STA2 102 may include at least one array antenna 121. A MIMO operation relates to simultaneous transmission/reception of multiple spatial streams. Each array antenna may be used for transmission/reception of a spatial stream in a sector at a time.

The sector may correspond to a specific antenna beam or pattern. A transmit (TX) sector may be a sector for a TX antenna, and a receive (RX) sector may be a sector for a RX antenna.

Figure 2:
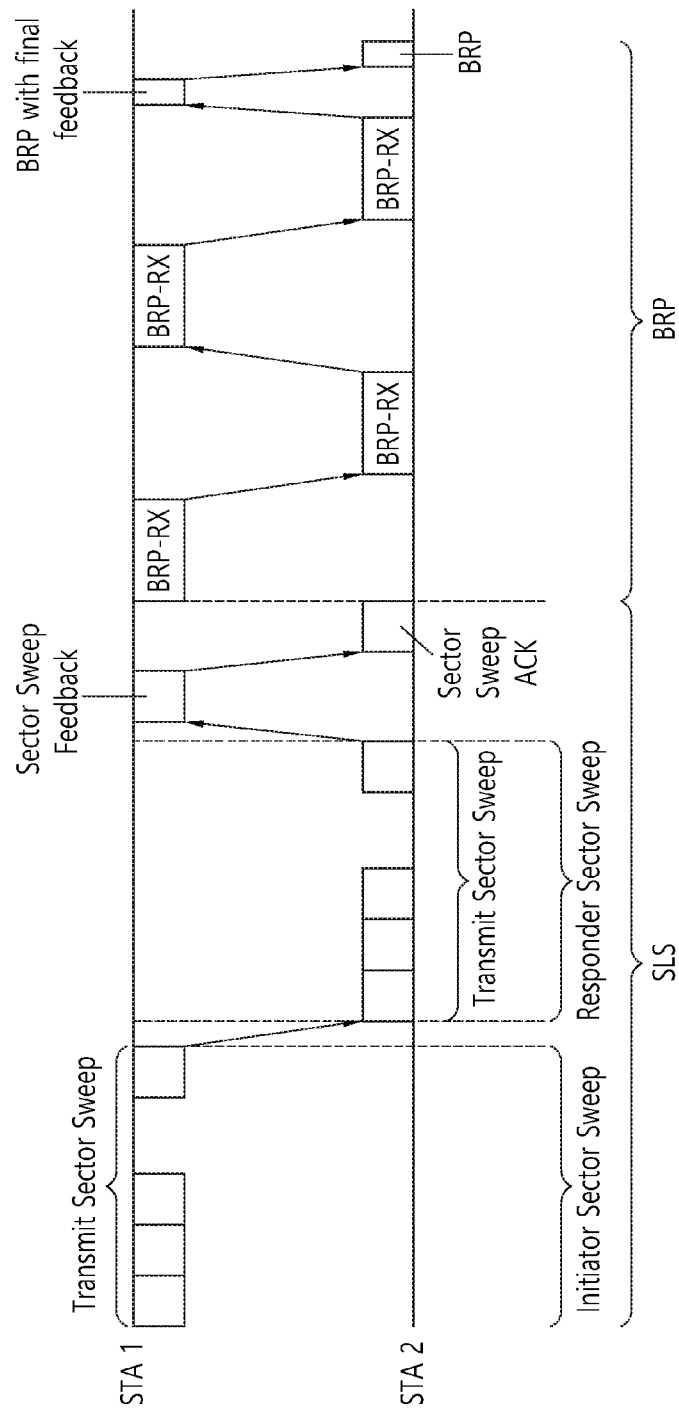
FIG. 2 is a diagram illustrating a BF training process according to the related art.

FIG. 2 is a diagram illustrating a BF training process according to the related art. This may refer to section 9.35 of the IEEE 802.11ad standard.

The BF training may provide transmission of a BF training frame using a sector sweep (SSW) and signaling required for each STA to determine setting an appropriate antenna system. The BF training process may include a sector level sweep (SLS) process and a beam refinement protocol (BRP) process. The SLS process for the sector sweep may be to communicate such that a control physical layer (PHY) is provided between the STAs. The BRP process may provide a refinement of an antenna weight vector between a transmitter and a receiver.

First, the STA1 as the initiator may transmit a sector sweep (SSW) message. The sector sweep message may include a directional multi-gigabit (DMG) beacon frame and/or a sector sweep (SSW) frame. During the sector sweep, the STA1 may send the sector sweep message through all sectors.

The STA2 as the responder may respond to a sector sweep message. The sector sweep message of the responder may be the SSW frame. The SSW frame may include information on a sector selected by the STA2. The SSW frame may further include feedback information on one or more sectors having best quality among sectors received by the STA2. The quality may include a signal to noise ratio (SNR) or a Signal-to-interference-plus-noise ratio (SINR).

The STA1 that receives a sector sweep of the STA2 may send a sector sweep feedback to the STA2. The sector sweep feedback may include information about a sector and an antenna of a frame, which has the best quality, from among frames received from the responder. Furthermore, the sector sweep feedback may include information about a signal to noise ratio (SNR) measured in a frame having the best quality.

The STA2 may send a sector sweep Ack to the STA1. The sector sweep Ack may be transmitted through a sector specified by the lastly received sector sweep feedback.

A sector (a TX sector and/or a RX sector) in which an initiator has the best quality and a sector (a TX sector and/or a RX sector) in which a responder has the best quality may be determined through the SLS process.

When the SLS process is completed, the STA may initiate the BRP process to perform beamforming training of the TX and RX antenna array. The BRP process may include a BRP setup subphase, a multiple sector ID detection (MID) subphase, and a beam combining (BC) subphase.

The conventional BF training merely assumes one-to-one training between two STAs. When there are a great number of responders, it may be required to sequentially perform the BF training with respect to each of the responders. This may cause an excessive time to complete the BF training.

According to proposed embodiments, a plurality of BF trainings may be performed parallelly by generating a plurality of polarization beams using a polarization.

Figure 3:
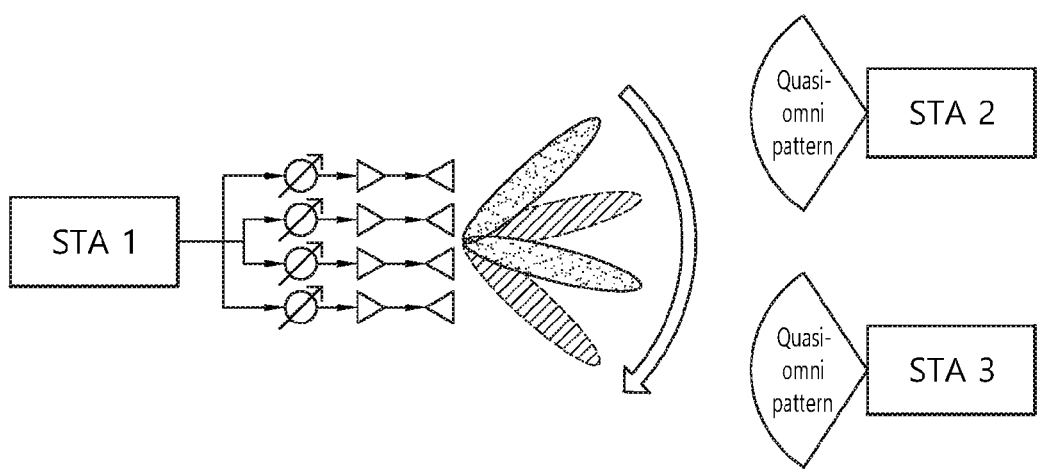
FIG. 3 is a diagram illustrating an example of a BF training using a polarization.

FIG. 3 is a diagram illustrating an example of a BF training using a polarization.

For TX and RX antennas, a polarization relates to an orientation of an electric field about an electromagnetic (EM) wave. Even under a high-frequency band such as 60 GHz or above, polarization characteristics of the EM wave may be strongly maintained.

A STA1 may include an antenna (e.g., a multi-beam array (MBA) antenna) having a dual-polarization. The STA1 may perform BF training together with the STA2 using a polarization beam having a first polarization type. At the same time, the STA1 may perform BF training together with a STA3 using a polarization beam having a second polarization type. In addition, when the STA2 and the STA3 have dual-polarization, a single STA may perform simultaneous BF trainings using two different polarization beams. In this case, two different sectors may be transmitted by the single STA.

The polarization type may refer to an orientation of an electric field emitted from an antenna. For example, the polarization type may include a vertical polarization (VP), a horizontal polarization (HP), a left-hand circular polarization (LHCP), a right-hand circular polarization (RHCP), etc.

Figure 4:
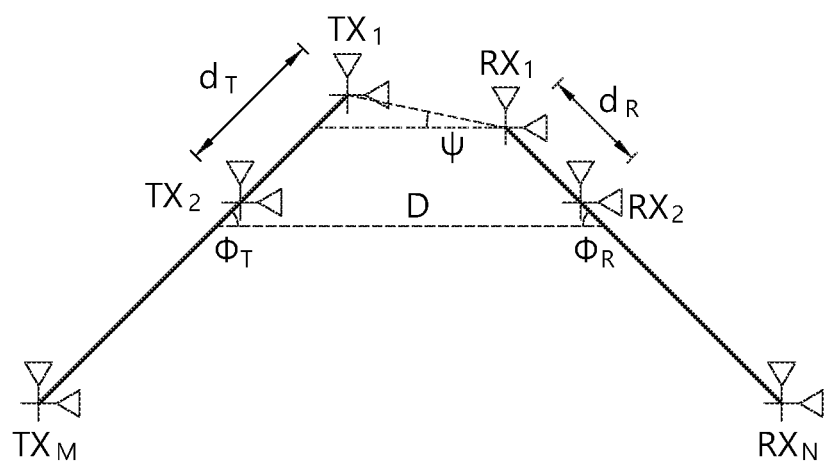
FIG. 4 is a diagram illustrating the characteristics of a polarized channel.

FIG. 4 is a diagram illustrating the characteristics of a polarized channel.

In consideration of the line-of-sight (LOS) conditions at a frequency band of 60 GHz, the characteristics of the polarized channel is as follows.

M polarized antennas are on a transmitter side and N polarized antennas are on a receiver side. A distance between two adjacent antennas at the transmitter is $d_T$ and a distance between two adjacent antennas at the receiver is $d_R$. When a straight line between center points of the transmitter and the receiver is connected, a distance between the center pointers may be referred to as "D". Polarization antennas of the transmitter are inclined from the horizontal by $\Phi_T$. Polarization antennas of the receiver are inclined from the horizontal by $\Phi_R$.

Channel characteristics h in a LOS link at the frequency band of 60 GHz is as follows.

$$h = \frac{e^{-jkd}}{d} G_R G_T \cos\theta_P \quad \text{[Equation 1]}$$

Here, θp is a polarization mismatch angle between the transmitter and the receiver. In the actual communication environment, the possibility that the polarization angle of the signal transmitted from the transmission antenna is not exactly the same at the receiving antenna may be high. This is called "polarization mismatch". $G_R$ is the antenna gain indicating the field pattern of the receiver. $G_T$ is the antenna gain indicating the field pattern of the transmitter. d is a distance between a transmission antenna m (1<=m<=M) and a receiving antenna n (1<=n<=N), the distance d is calculated as follows:

$$\left[\left(D - \left(\frac{N+1}{2} - n\right)d_R\cos\phi_R - \left(\frac{M+1}{2} - m\right)d_T\cos\phi_T\right)^2 + \left(\left(\frac{N+1}{2} - n\right)d_R\sin\phi_R - \left(\frac{M+1}{2} - m\right)d_T\sin\phi_T\right)^2\right]^{\frac{1}{2}} \quad \text{[Equation 2]}$$

Considering the above channel characteristics may be represented by the matrix equation as follows:

$$H_{LOS} = \begin{bmatrix} H_{N \times M}^{VV} & H_{N \times M}^{VH} \\ H_{N \times M}^{HV} & H_{N \times M}^{HH} \end{bmatrix} = \begin{bmatrix} H'_{N \times M} \cdot A_{N \times M}^{VV} & H'_{N \times M} \cdot A_{N \times M}^{VH} \\ H'_{N \times M} \cdot A_{N \times M}^{HV} & H'_{N \times M} \cdot A_{N \times M}^{HH} \end{bmatrix} \quad \text{[Equation 3]}$$

$H'_{N \times M}$ is a LOS channel matrix for the N transmitters and the M receivers. $A_{N \times M}$ is a matrix considering the polarization mismatch.

To help understand the present invention, 2×2 polarized MIMO channel may be represented as follows:

$$H_{LOS} = \begin{bmatrix} \dfrac{e^{-jkD}}{D} G_R^V G_T^V \cos\theta_P & -\dfrac{e^{-jkD}}{D} G_R^V G_T^H \cos\left(\dfrac{\pi}{2} - \theta_P\right) \\ \dfrac{e^{-jkD}}{D} G_R^H G_T^V \cos\left(\dfrac{\pi}{2} - \theta_P\right) & \dfrac{e^{-jkD}}{D} G_R^H G_T^H \cos\theta_P \end{bmatrix}$$ [Equation 4]

Ideally, if the polarization at the transmitter passes to the receiver without polarization mismatch, a vertical-vertical polarized channel and a horizontal-horizontal polarized channel may have the same characteristics. However, if there is a polarization mismatch, the vertical-vertical polarized channel and the horizontal-horizontal polarized channel may be changed according to the cos θp, and the horizontal-vertical polarized channel and the vertical-horizontal polarized channel may be changed according to the sin θp. Accordingly, in LOS condition in which the polarization mismatch exists, it may be seen that optimum beams for the vertical-vertical polarized channel and the horizontal-horizontal polarized channel are the same.

In consideration of this channel condition, embodiments to perform a beamforming process by using a plurality of beams having polarization characteristic are as follow.

Figure 5:
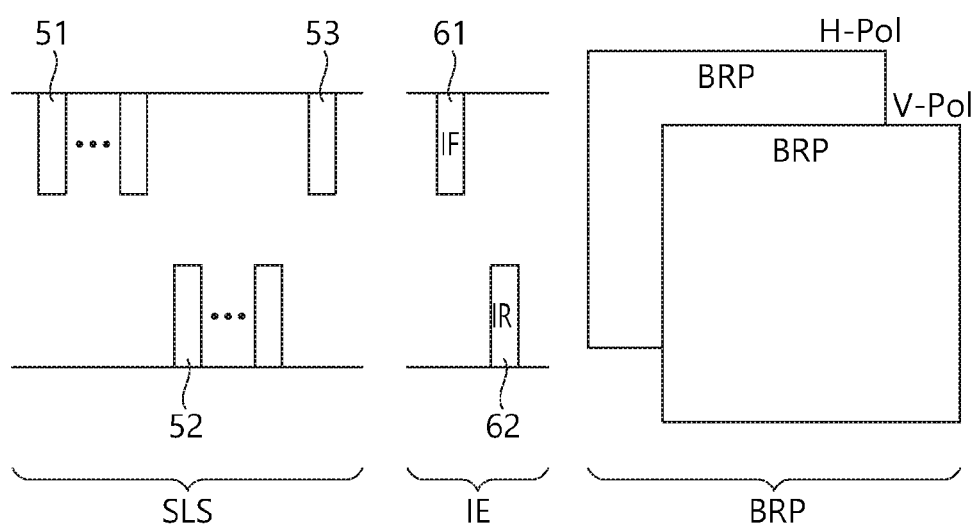
FIG. 5 is a diagram illustrating a BF training process according to an embodiment of the present invention.

FIG. 5 is a diagram illustrating a BF training process according to an embodiment of the present invention.

A STA1 may be an initiator, and STA2 may be referred to as responder. There may be a plurality of responders.

First, the STA1 and the STA2 performs the SLS process. the STA1 as the initiator may transmit an initial frame 51 and the STA2 as the responder may respond to a response frame 52. The initial frame may be an SSW frame or a beacon frame. The response frame 52 may be the SSW frame. The response frame 52 may include a feedback information for one or more sectors, with the best quality in a frame that the STA 2 receives, from among sectors which the STA 1 sends with information for sectors which the STA 2 sends.

The STA1 that receives a sector sweep of the STA2 may send a sector sweep feedback to the STA2. The sector sweep feedback may include information about a sector and an antenna of a frame, which has the best quality, from among frames received from the responder. Furthermore, the sector sweep feedback may include information about a signal to noise ratio (SNR) measured in a frame having the best quality.

A sector (a TX sector and/or a RX sector) in which an initiator has the best quality and a sector (a TX sector and/or a RX sector) in which a responder has the best quality may be determined through the SLS process. A sector which is determined through the SLS process is referred to as a "candidate sector".

When the SLS process is completed, information exchange (IE) process for performing multi-beam training between the responder and the initiator is initiated.

The initiator (or responder) send information request frame 61 to the responder (or initiator). Information response (IR) frame 62 is transmitted in response to the information request frame 61. Both the information request frame 61 and Information response (IR) frame 62 may be transmitted through the selected candidate sector in the SLS process.

The information request frame 61 and Information response (IR) frame 62 are a management frame to be transmitted in a state in which the initiator and the responder are connected.

When the information request frame 61 is transmitted by the initiator, the following table shows the information elements included in the information request frame 61. All elements are not essential and name or bit number may be only an example.

TABLE 1

| Name | Bit number | Content |
|---|---|---|
| Transmission STA ID | 12 or 16 | This indicates the STA that transmits the frame. |
| Receiving STA ID | 12 or 16 | This indicates the STA that receives the frame. When the receiving STA ID is a specific value, this indicates that the frame broadcasts. |
| BF capacity | 1 | Indicating whether the BF capacity supports the polarization channels. For example, if a polarization indicator is "1", the initiator supports the polarized channel. |
| Polarization indicator | 1 | Supported polarization channel For example, when a multiple BF Indicator is "0", there is no supported polarization channels. When the multiple BF Indicator is "1", the multiple BF Indicator supports dual polarization. |
| Multiple BF Indicator | 2 | The number of multi-BF training that is supported at the same time. |
| Polarization Type | — | It represents one of the linear polarization, elliptical polarization, circular polarization and the mixed polarization. |
| Polarization Switching | — | Indicates variations of polarization or switching status. Switching from the used polarization effect to other polarization effect. |
| MIMO polarization | — | When the MIMO environment is required or wish to use such a situation, used to select the appropriate polarization |
| Channel Performance | — | Indicating the performance degree of polarization channel. Indicating a measure for how much of the reliability of the polarization channel that is used or being used. |

The information response frame 62 may include some or all of the elements shown in Table 1.

After performing the conventional SLS process, there is no MIMO mode and there is no case of supporting a plurality of beam-forming at the same time. According to an embodiment of the present invention, the information exchange (IE) procedure for the multiple beam forming process is performed after the SLS process.

After the information exchange (IE) process is completed, the multi-BRP process for more training a RX and TX antenna array in the candidate sectors may be initiated. For example, the first BRP process is carried out through a vertical polarization channel and the second BRP process may be carried out through the horizontal polarization channel.

As previously proved, when both the vertical polarization channel and the horizontal polarization channel are the same, the best beam selection for a single stream may reduce the time according to the BF training by performing BF at the same time from a sector.

Figure 6:
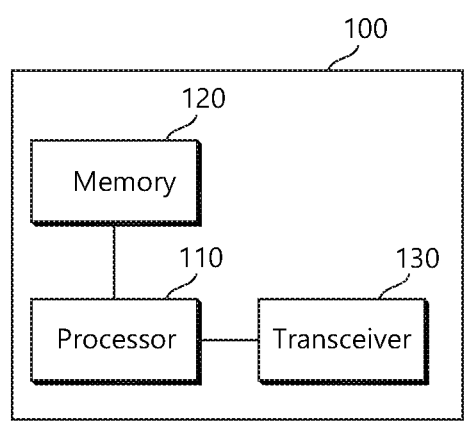
FIG. 6 is a block diagram illustrating a device which implements an embodiment of the present invention.

FIG. 6 is a block diagram illustrating a device which implements an embodiment of the present invention.

A device 100 may include a processor 110, a memory 120 and a transceiver 130.

The memory 120 may be coupled to the processor 110 and may store various instructions executed by the processor 110. The transceiver 130 may be coupled to the processor 110 and may transmit and/or receive a radio signal. The processor 110 implements the proposed functions, processes and/or methods. An operation of the STA (initiator or responder) in embodiments above described may be implemented by the processor 110. When the above-described embodiments be implemented in software instructions, the instructions may be stored in the memory 120 and executed by the processor 110 to perform the above-described operation.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the aforementioned exemplary systems, methods, but is described on the basis of the flowchart as a series of steps or blocks, the present invention is not limited to the order of the steps, which steps are described above as, can occur with other steps and in a different order or simultaneously. In addition, those skilled in the art will appreciate that the steps illustrated in the flow chart may be deleted without affecting the scope of, not exclusive, a different step, or contains one or more of the steps of the flow chart the present invention.

What is claimed is:

1. A method for multiple beamforming training in a wireless local area network (LAN), the method comprising:
    determining, by an initiator, a candidate sector to be used for a transmission by sending a plurality of sector sweep (SSW) messages to a responder simultaneously in a plurality of sector groups through a plurality of antennas during a sector sweep;
    transmitting, by the initiator, an information request frame for multiple beamforming training through the candidate sector to the responder;
    receiving, by the initiator, an information response frame from the responder in response to the information request frame through the candidate sector; and
    performing, by the initiator, a plurality of beam refinement protocol (BRP) processes using a plurality of polarized channels through the candidate sector.

2. The method of claim 1, wherein the information request frame includes capability information indicating whether the initiator supports the multiple beamforming training.

3. The method of claim 1, wherein the information request frame includes a polarization indicator indicating the plurality of polarized channels.

4. The method of claim 1, wherein the plurality of BRP processes are performed at the same time.

5. The method of claim 4, wherein the plurality of polarized channels include a horizontal polarization channel and a vertical polarization channel.

6. The method of claim 1, wherein the information response frame includes capability information indicating whether the responder supports the multiple beamforming training information.

7. An apparatus for performing multiple beamforming training in a wireless local area network (LAN), the apparatus comprising:
    a transceiver configured to receive and transmit a radio signal; and
    a processor connected to the transceiver and configured to:
    determine a candidate sector to be used for a transmission by sending a plurality of sector sweep (SSW) messages to a responder simultaneously in a plurality of sector groups through a plurality of antennas during a sector sweep;
    transmit an information request frame for multiple beamforming training through the candidate sector to the responder;
    receive an information response frame from the responder in response to the information request frame through the candidate sector; and
    perform a plurality of beam refinement protocol (BRP) processes using a plurality of polarized channels through the candidate sector.

8. The apparatus of claim 7, wherein the information request frame includes capability information indicating whether the apparatus supports the multiple beamforming training.

9. The apparatus of claim 7, wherein the information request frame includes a polarization indicator indicating the plurality of polarized channels.

10. The apparatus of claim 7, wherein the plurality of BRP processes are performed at the same time.

* * * * *